Dec. 4, 1928. 1,694,240
L. S. WALLE
TIME ELEMENT DEVICE
Filed Feb. 5, 1926
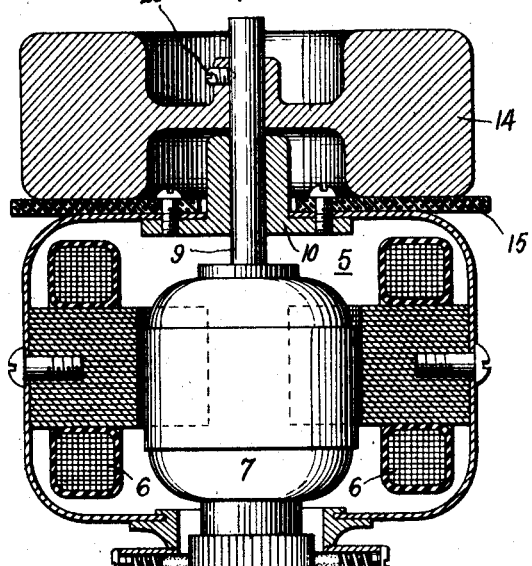
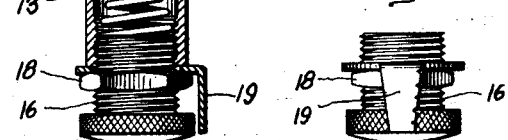
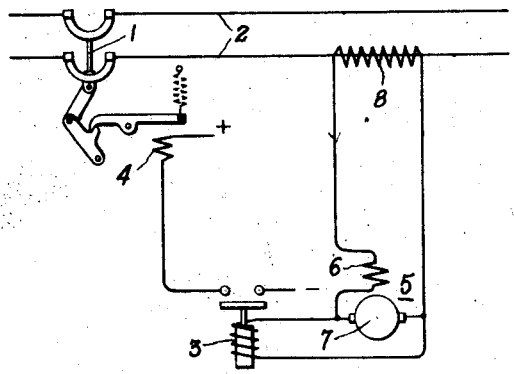
Inventor:
Ludvig. S. Walle,
by *Alexander S. [signature]*
His Attorney.

Patented Dec. 4, 1928.

1,694,240

UNITED STATES PATENT OFFICE.

LUDVIG S. WALLE, OF SCOTIA, NEW YORK, ASSIGNOR TO GENERAL ELECTRIC COMPANY, A CORPORATION OF NEW YORK.

TIME-ELEMENT DEVICE.

Application filed February 5, 1926. Serial No. 86,334.

My invention relates to improvements in time element devices, and more particularly to time element circuit controlling devices for the control of electric circuits, especially on the occurrence of abnormal circuit conditions, and has for an object to provide a time element device having improved operating characteristics.

My invention will be better understood from the following description taken in connection with the accompanying drawing, and its scope will be pointed out in the appended claims.

In the accompanying drawing, Fig. 1 illustrates, partly in elevation and partly in section, a time element device embodying my invention; Fig. 2 illustrates diagrammatically an embodiment of my invention in a time element circuit controlling device; and Fig. 3 is a detail of an adjusting device for the embodiment of my invention shown in Fig. 1.

The switching arrangement illustrated in Fig. 2 comprises a movable circuit controlling member such as the contact operating rod of a circuit breaker 1 arranged to control a circuit 2. The operation of the circuit controlling member is controlled by means comprising an electroresponsive device 3 herein shown as arranged to control the circuit breaker trip coil 4. The electroresponsive device 3 may be a substantially instantaneous relay which in accordance with my invention is arranged to be energized from the circuit 2 and to have its energization controlled by means such as a motor element 5, a physical embodiment of which is shown in Fig. 1. The motor element, or more simply, motor, is herein shown as of the series commutator type having a field winding 6 and an armature 7 connected to be energized from the circuit 2 as through a current transformer 8.

In order to obtain a time action dependent on a predetermined electric condition, such as an abnormal circuit condition or fault causing current in excess of a predetermined value, the winding of the relay 3 is connected in circuit with the motor 5 so that the energization of the relay depends on the counter-electromotive force of the motor and the impedance of the armature. Since the counter-electromotive force is dependent on the speed or angular velocity of the armature 7, the motor 5 is arranged normally to be inactive so that very little current flows in the relay winding but to be set into operation when the predetermined electric condition occurs. With the relay winding connected in parallel to the armature 7, as shown, the current flowing in the relay winding when the armature is not rotating depends on the relative impedances of the relay and the armature, and as the speed of the armature increases, more and more current is diverted through the relay winding due to the increasing counter-electromotive force of the armature until a current sufficient to operate the relay occurs. For normally restraining the armature 7 against movement and yet under certain conditions permitting its angular velocity to build up with a time delay action, the armature is yieldably supported and is arranged to have a substantial moment of inertia. As shown, the armature shaft 9 may be slidably journaled in bearings 10, 11 and yieldably supported on a thrust bearing 12, herein illustrated as of the ball type and supported by suitable resilient means such as a spring 13. The inertia may be provided by a fly wheel 14 secured to the shaft 9 and having its mass substantially concentrated in the rim. The weight of the flywheel 14 is such as to hold the armature 7 down against the pressure of the spring 13 with the flywheel engaging a braking surface such as a disc 15 of suitable material for example leather so as to restrain the armature against rotation.

For varying the current necessary to raise the armature 7 so that it can rotate, suitable means for varying the position of the armature is provided. As shown, this means comprises a movable spring seat such as a plug 16 screwed into a casing 17 supported on the motor 5. This plug may be secured against movement by a jamb nut 18 which also locks a position or adjustment indicator such as a notched member 19 against movement. The position of the flywheel 14 on the shaft 9 for any given adjustment can readily be changed by means of the set-screw 20.

Assuming normal circuit conditions and the parts positioned as shown in the drawing, there is not enough current in the winding of the relay 3 to cause operation thereof, since the armature 7 of the motor 5 is not moving. Any condition on the circuit 1 causing a current sufficient to raise the armature 7 and its associated parts so that rotation thereof can occur, causes the counter electromotive force of the motor to build up as the speed of the motor is increased and more and more current is diverted through the winding of the relay 3. However, since the inertia of the armature 7 and its associated parts retards the building up of the armature velocity, a time interval which is inversely proportional to the circuit current is required before sufficient current passes through the relay winding to cause the operation of the relay. With the arrangement shown it is possible to obtain satisfactory discriminating operation over a wide range in the time-current characteristic with practically instantaneous operation on over-current values which exceed anything in excess of several times normal load, since enough current then passes through the relay winding before the armature builds up any counter electromotive force.

While I have shown my invention applied to an alternating current circuit wherein the motor 5 is supplied from the current transformer 8, it is to be understood that my invention may be applied to direct current circuits in which case the motor 5 will be connected in series relation with the circuit where over-current protection is desired. It will also be understood that changes and variations in the particular construction disclosed may be made without departing from my invention.

What I claim as new and desire to secure by Letters Patent of the United States, is:—

1. A time element circuit controlling device comprising a relay having a winding connected to be energized from the circuit and means for controlling the energization of the relay comprising a motor having an armature connected in circuit with the relay winding, means for normally restraining the armature against movement arranged to permit movement of the armature on the occurrence of an abnormal circuit condition and to retard the building up of the angular velocity of the armature whereby to delay the operation of the relay in accordance with the counter electromotive force of the armature.

2. A time element circuit controlling device comprising a motor having an armature connected to be energized in accordance with the circuit current, means for normally restraining the armature against movement arranged to permit movement of the armature on the occurrence of a predetermined current and to retard the building up of the angular velocity of the armature, and electroresponsive means comprising a winding connected in parallel with the armature and arranged to be actuated after a time which is dependent on the counter electromotive force of the armature.

3. A time element device comprising a normally inactive motor arranged to be set into operation when energized by current of a predetermined value and provided with a rotatable armature arranged to have a substantial moment of inertia, and means comprising a winding in circuit with the motor armature and arranged to be actuated when the counter electromotive force of the motor assumes a predetermined value.

4. A time element circuit controlling device comprising a normally inactive motor arranged to be set into operation on the occurrence of a predetermined circuit condition and provided with a rotatable armature arranged to have a substantial moment of inertia, and electroresponsive means comprising a winding connected in parallel with the motor armature and arranged to be actuated when the counter electromotive force of the armature attains a predetermined value.

5. A time element circuit controlling device comprising a normally inactive motor arranged to be set into operation on the occurrence of a predetermined circuit condition and provided with a rotatable armature arranged to have a substantial moment of inertia, and electroresponsive means comprising a winding in circuit with the motor armature and arranged to be actuated when the counter electromotive force of the armature becomes a predetermined value.

6. A time element switching arrangement comprising a movable circuit controlling member, electroresponsive means for controlling the operation thereof, and a normally inactive motor provided with an armature arranged to have a substantial moment of inertia and to be rotated on the occurrence of a predetermined circuit condition, the armature being connected to control the energization of the electroresponsive means whereby to effect operation of the movable circuit controlling member after a time dependent on the counter electromotive force of the armature.

7. A time limit circuit controlling device comprising a relay having a winding connected to be energized from the circuit and means for controlling the energization of the relay comprising a motor having an armature connected in parallel with the relay winding, means for normally restraining the armature against movement comprising a member having a substantial moment of inertia, said member being arranged to permit rotation of the armature on the occurrence of an abnormal circuit condition and to retard the building up of the angular velocity of the armature whereby to change the distribution of the current in the relay winding and the armature in accordance with the counter electromotive force of the armature.

8. An overload protective device for an electric circuit comprising a current coil adapted to be energized by the current in the circuit to be protected, an instantaneous trip coil connected in series with said current coil, and inductive means shunted across the terminals of said current coil characterized by setting up a counter-electromotive force to oppose the current flowing through it, whereby to cause time delayed operation of said trip coil upon overload.

9. An overload protective device for an electric circuit including a trip coil, a source of energy for said trip coil responsive to the current flowing in the circuit to be protected, and means adapted under normal conditions to divert current from said trip coil, said means including a device shunted across said trip coil and characterized by operating under overload conditions in the circuit to build up a counter-electromotive force and thereby cause increased current to flow through said trip coil.

In witness whereof, I have hereunto set my hand this 4th day of February, 1926.

LUDVIG S. WALLE.